(No Model.)
J. MENGE.
LAMP STOVE.
No. 427,181. Patented May 6, 1890.
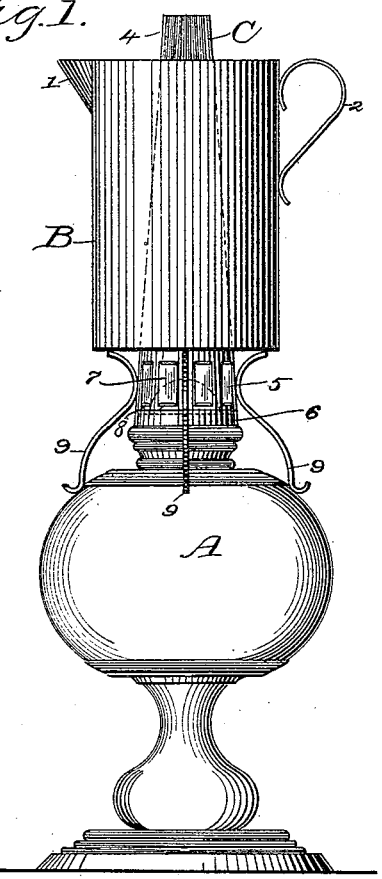
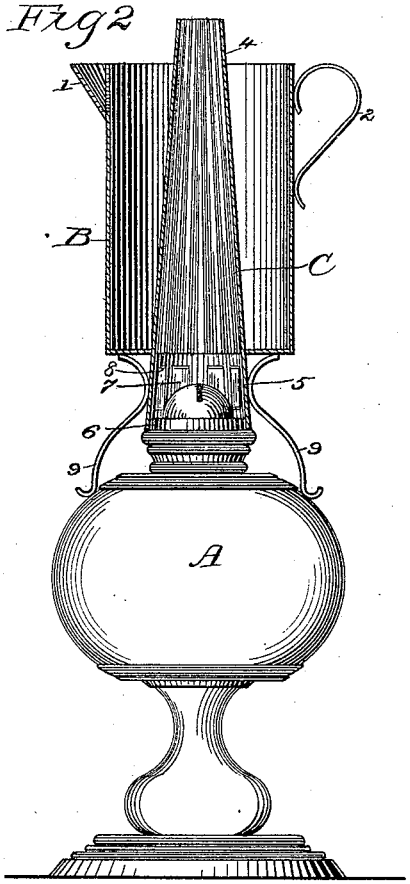
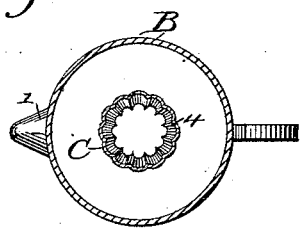
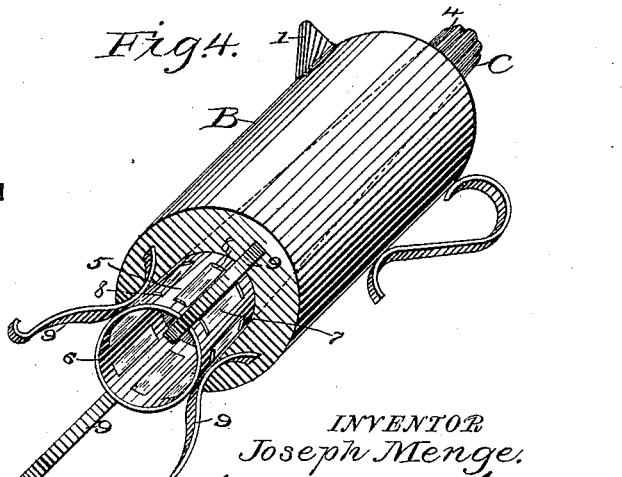
WITNESSES
Wm Musser
B. W. Sommers
INVENTOR
Joseph Menge.
by A. G. Heysinger
Attorney

UNITED STATES PATENT OFFICE.

JOSEPH MENGE, OF NEW ORLEANS, LOUISIANA.

LAMP-STOVE.

SPECIFICATION forming part of Letters Patent No. 427,181, dated May 6, 1890.

Application filed February 1, 1890. Serial No. 338,858. (No model.)

*To all whom it may concern:*

Be it known that I, JOSEPH MENGE, a citizen of the United States of America, residing at New Orleans, in the parish of Orleans and State of Louisiana, have invented new and useful Improvements in Lamp-Stoves, of which the following is a specification.

My invention has relation to improvements in lamp-stoves of that character or class adapted for use, in connection with a common or domestic illuminating-lamp, by adjustment or combination of a liquid-holding vessel constructed with a central flue to serve as the chimney of the lamp, with the wick device and body of the lamp.

The object is to improve and simplify the existing constructions; and my invention therefore consists in the novel construction of parts and their combination, as will be more fully hereinafter specified, and specially as the same is pointed out in the claim made hereto.

Utensils of the character allied to my improved lamp-stove have been made with central flues of various constructions, but lacking, so far as I am aware, in an enlarged heating or contact surface in the flue or chimney; and it is the purpose of my improvements to remedy this defect by making the flue or chimney crimped or corrugated its entire length through the vessel, thus attaining enlarged heating-surfaces exposed to the action of the calorific, and of course to the liquid in the vessel. Another purpose is to utilize that part of the flue or chimney projecting below the bottom of the vessel as a means for giving forth the illuminating-rays of the flame, and I also construct the vessel with supports adapted to sustain it in an upright position when removed from the lamp, and support it securely and safely when used in connection therewith.

I have fully illustrated my invention in the accompanying drawings, forming a part of this specification, wherein—

Figure 1 is a side view of the lamp with vessel applied. Fig. 2 is a vertical central section through the vessel. Fig. 3 is a transverse section through the chimney or flue, and Fig. 4 is a perspective of the vessel.

In the drawings in the different figures where the same numerals and letters of reference are used they designate the same parts.

Reference being had to the drawings, A designates a lamp, which may be of any of the well-known and approved kinds.

B designates the vessel to be applied to the lamp. This vessel B may be of any desired shape exteriorly and provided with a pouring-lip 1, a handle 2, and cover 3. Securely soldered in the bottom of the vessel is the chimney C. This is preferably a tapering column having its lower part secured to the bottom, and of such length as to have its top project above the top of the vessel. In order that the surface heated by the calorific and in contact with the contents of the vessel may be of the largest possible area, I form the chimney with flutings or corrugations 4, extending for its length. They may be angular or circular in cross-section, as desired. The lower end of the chimney projects below the bottom of the vessel and is formed with a cage 5, having a rim-band 6, to set on the burner of the lamp. About this cage I secure strips of mica 7, which close the windows of the cage and give the same drafts as an ordinary lamp-chimney. At the same time the transparent spaces give forth the rays of the flame sufficient to light up the surroundings. The mica may consist of a single piece, or panes to fit the windows of the case may be used. In either case fastening-flanges 8 at top and bottom of the windows are struck down over the edges to hold it in position.

To the bottom of the vessel or to the rim-flange of the cage are secured legs 9. These are formed to press against the cage of the lamp, and set with their feet on the top of the bowl of the lamp, thus holding the vessel steady in place.

When the vessel is removed from the lamp, the legs afford means for sustaining it in an upright position on any supporting-surface. The legs are made of metal strips or wires and may be adapted in length by bending to suit the length of the neck of any lamp to which the vessel may be applied.

What I claim is—

The lamp-stove herein described, composed of the containing-vessel B, provided with a central chimney C, formed with longitudinal crimps or flutings 4, extended for its length, and having a cage 5, formed with a bottom rim-flange and openings and projecting below the bottom of the vessel, said openings being closed with mica panes, and legs 9, secured to the vessel, substantially as described, and for the purpose stated.

In witness whereof I have hereunto set my hand in the presence of two attesting witnesses.

JOSEPH MENGE.

Attest:
I. BENDEMONT,
WM. KENANDIN.